United States Patent
Rorato et al.

(10) Patent No.: US 11,256,832 B2
(45) Date of Patent: Feb. 22, 2022

(54) REPLICA SELECTION

(71) Applicant: DASSAULT SYSTEMES, Velizy Villacoublay (FR)

(72) Inventors: Remy Rorato, Paris (FR); Laurent Marini, Paris (FR)

(73) Assignee: DASSAULT SYSTEMES, Velizy Villacoublay (FR)

(*) Notice: Subject to any disclaimer, the term of this patent is extended or adjusted under 35 U.S.C. 154(b) by 621 days.

(21) Appl. No.: 15/852,664

(22) Filed: Dec. 22, 2017

(65) Prior Publication Data

US 2018/0181682 A1 Jun. 28, 2018

(30) Foreign Application Priority Data

Dec. 22, 2016 (EP) .................................. 16306790

(51) Int. Cl.
*G06F 30/00* (2020.01)
*G06T 17/10* (2006.01)
(Continued)

(52) U.S. Cl.
CPC .............. *G06F 30/00* (2020.01); *G06T 17/10* (2013.01); *G06F 16/5854* (2019.01); *G06F 2111/02* (2020.01); *G06F 2111/04* (2020.01); *G06F 2111/10* (2020.01); *G06F 2111/20* (2020.01); *G06K 9/00214* (2013.01); *G06K 9/46* (2013.01);
(Continued)

(58) Field of Classification Search
CPC .. G06F 30/00; G06F 16/5854; G06F 2111/10; G06F 2111/02; G06F 2111/04; G06F 2111/20; G06T 19/20; G06T 17/20; G06T 19/00; G06T 17/00; G06T 7/73; G06K 9/00214; G06K 9/46
See application file for complete search history.

(56) References Cited

U.S. PATENT DOCUMENTS

| | | | |
|---|---|---|---|
| 6,212,484 B1* | 4/2001 | Chen | G06T 17/10 |
| | | | 345/619 |
| 8,244,508 B1* | 8/2012 | Dean | G06G 7/48 |
| | | | 703/7 |

(Continued)

FOREIGN PATENT DOCUMENTS

| | | |
|---|---|---|
| CN | 101188021 A | 5/2008 |
| CN | 101359342 A | 2/2009 |

(Continued)

OTHER PUBLICATIONS

N. B. Ismail, N. B. A. Bakar, "Boundary Representation-Based Feature Recognition" Jun. 1997, pp. 65-74. (Year: 1997).*

(Continued)

*Primary Examiner* — Kibrom K Gebresilassie
(74) *Attorney, Agent, or Firm* — Oblon, McClelland, Maier & Neustadt, L.L.P.

(57) ABSTRACT

Described herein is a computer-implemented method for designing a three-dimensional modeled physical part. The method comprises providing a boundary representation of the modeled physical part, selecting, upon user action, a subset of the boundary representation that represents a geometric feature, identifying all the subsets of the boundary representation that are similar to the selected subset of the boundary representation by applying a feature similarity function.

7 Claims, 6 Drawing Sheets

(51) Int. Cl.

| | |
|---|---|
| G06F 111/02 | (2020.01) |
| G06F 111/04 | (2020.01) |
| G06F 111/20 | (2020.01) |
| G06T 7/73 | (2017.01) |
| G06K 9/00 | (2022.01) |
| G06F 111/10 | (2020.01) |
| G06T 19/00 | (2011.01) |
| G06T 19/20 | (2011.01) |
| G06F 16/583 | (2019.01) |
| G06T 17/00 | (2006.01) |
| G06K 9/46 | (2006.01) |
| G06T 17/20 | (2006.01) |

(52) U.S. Cl.
CPC ............... *G06T 7/73* (2017.01); *G06T 17/00* (2013.01); *G06T 17/20* (2013.01); *G06T 19/00* (2013.01); *G06T 19/20* (2013.01)

(56) References Cited

U.S. PATENT DOCUMENTS

| | | | | |
|---|---|---|---|---|
| 8,248,407 | B2* | 8/2012 | Deslandes | G06F 30/17 345/420 |
| 8,645,107 | B2 | 2/2014 | Gibson et al. | |
| 8,970,590 | B1* | 3/2015 | Brennan | G06T 17/20 345/423 |
| 9,269,189 | B1* | 2/2016 | Marinov | G06T 17/30 |
| 9,449,430 | B2* | 9/2016 | Janvier | G06T 17/005 |
| 9,465,891 | B1* | 10/2016 | Kagan | G06F 3/04815 |
| 9,798,835 | B2* | 10/2017 | Rorato | G06T 19/20 |
| 9,875,577 | B2* | 1/2018 | Quilot | G06T 17/20 |
| 2002/0095276 | A1 | 7/2002 | Rong et al. | |
| 2007/0279414 | A1* | 12/2007 | Vandenbrande | G06T 17/10 345/420 |
| 2008/0215510 | A1* | 9/2008 | Regli | G06F 16/2468 706/12 |
| 2009/0157649 | A1 | 6/2009 | Papadakis et al. | |
| 2009/0182450 | A1 | 7/2009 | Goldschmidt | |
| 2010/0121611 | A1* | 5/2010 | Hu | G06F 30/00 703/1 |
| 2011/0224813 | A1 | 9/2011 | Takatsuka | |
| 2012/0221297 | A1* | 8/2012 | Nanson | G06T 19/00 703/1 |
| 2013/0127874 | A1* | 5/2013 | Peterson | G06T 13/80 345/473 |
| 2014/0184594 | A1* | 7/2014 | Janvier | G06F 30/12 345/420 |
| 2014/0184599 | A1* | 7/2014 | Quilot | G06T 17/20 345/423 |
| 2014/0188439 | A1* | 7/2014 | Rorato | G06F 30/13 703/1 |
| 2014/0192050 | A1 | 7/2014 | Qiu et al. | |
| 2014/0354636 | A1* | 12/2014 | Rorato | G06T 9/00 345/420 |
| 2014/0364985 | A1* | 12/2014 | Tiwari | G06F 30/00 700/107 |
| 2014/0375636 | A1* | 12/2014 | Young | G06F 30/00 345/420 |
| 2016/0133049 | A1* | 5/2016 | Hill | G06T 17/10 700/98 |
| 2016/0314341 | A1* | 10/2016 | Maranzana | G06F 30/00 |
| 2017/0004621 | A1* | 1/2017 | Maranzana | G06F 16/5854 |
| 2017/0371948 | A1 | 12/2017 | Rorato | |
| 2018/0181682 | A1* | 6/2018 | Rorato | G06F 30/00 |

FOREIGN PATENT DOCUMENTS

| | | |
|---|---|---|
| CN | 101842813 A | 9/2010 |
| CN | 103503468 A | 1/2014 |
| CN | 103617515 A | 3/2014 |
| CN | 103838916 A | 6/2014 |
| CN | 104133928 A | 11/2014 |
| JP | 2000-57184 | 2/2000 |
| JP | 2001-250130 | 9/2001 |
| JP | 2003-518294 A | 6/2003 |
| JP | 2005-49923 A | 2/2005 |
| JP | 2006-285570 A | 10/2006 |
| JP | 2006-331328 A | 12/2006 |
| JP | 2007-140641 A | 6/2007 |
| JP | 2010-211629 A | 9/2010 |
| JP | 2012-69108 A | 4/2012 |
| JP | 2014-130601 A | 7/2014 |
| JP | 2014-130602 A | 7/2014 |
| JP | 2017-528790 | 9/2017 |
| WO | WO 2016/178107 | 11/2016 |
| WO | 2017/074559 A1 | 4/2017 |

OTHER PUBLICATIONS

Office Action dated Jul. 17, 2018, in Japanese Patent Application No. 2014-109105 (with English-language translation), 5 pages.

Mark Pauly, et al.; "Discovering Structural Regularity in 3D Geometry"; ACM Transactions on Graphics, vol. 27, No. 3, Article 43, Publication date: Aug. 2008; XP-002700032; 11 pgs.

Leslie Gordon; "Comparing 3D CAD Modelers—What designers should know about history-based and dynamic schemes"; Machine Design; Nov. 22, 2006; http://machinedesign.com/article/comparing-3d-cad-modelers-1122; 4 pgs.

L. Chiang, et al.; "Identification of Patterns of Repeated Parts in Solid Objects"; IMATI Report Series; Nov. 2016; Consiglio Nazionale De LLE Richerche Istituto Di Matematica Applicata E Tecnologie Informatiche "Enrico Magenes"; Abstract only.

Quoc-Viet Dang, et al.; "Similarity Detection for Free-Form Parametric Models"; 21st International Conference on Computer Graphics, Visualization and Computer Vision 2013; ISBN 978-80-86943-75-6; 10 pgs.

Thomas Funkhouser, et al.; "Modeling by Example"; ACM Transactions on Graphics, ACM, US, vol. 23, No. 3, Aug. 1, 2004; XP008087089; ISSN: 0730-0301; 12 pgs.

Panagiotis Papadakis, et al.; "Efficient 3D Shape Matching and Retrieval Using a Concrete Radialized Spherical Projection Representation"; Pattern Recognition, The Journal of the Pattern Recognition Society; 2007; 16 pgs.

Michael Kazhdan, et al.; "Harmonic 3D Shape Matching"; Princeton University; 1 page.

Antoine Briere-Cote, et al.; "Comparing 3D CAD Models: Uses, Methods, Tools and Perspectives"; Computer-Aided Design & Applications, 2012; 24 pgs.

Thomas Funkhouser, et al.; "A Search Engine for 3D Models"; ACM Transactions on Graphics, vol. V, No. 10, 28 pgs.

Michael Kazhdan, et al.; "Rotation Invariant Spherical Harmonic Representation of 3D Shape Descriptors"; Eurographics Symposium on Geometry Processing (2003); 9 pgs.

Roland Maranzana; "3D Data Mining Part and Information Re-Use in a PLM Context"; Global Product Data Interoperability Summit 2013; 37 pgs.

Mingqiang Yang, et al.; "A Survey of Shape Feature Extraction Techniques"; HAL ID: hal-00446037; https://hal.archives-ouvertes.fr/hal-00446037; Submitted Jan. 12, 2010; 39 pgs.

Raluca D. Petre, et al.; "An Experimental Evaluation of View-Based 2D/3D Indexing Methods"; HAL ID: hal-00738212; https://hal.archives-ouvertes.fr/hal-00738212; Submitted Oct. 4, 2014; 6 pgs.

James R. Munkres; "Elements of Algebraic Topology"; Massachusetts Institute of Technology; Cambridge, Massachusetts; Library of Congress Cataloging in Publication Data; ISBN: 0-201-04586-9; Abstract only.

Petros Daras, et al.; "A 3D Shape Retrieval Framework Supporting Multimodal Queries" Int J Comput Vis (2010); Informatics and Telematics Instute, Centre for Research and Technology Hellas; Thessaloniki, Greece; 19 pgs.

Extended Search Report dated Feb. 11, 2011; in Europe Patent Application No. 10306026.5-2224, 9 pgs.

Extended Search Report dated Jun. 19, 2017; in Europe Patent Application No. 16306790.3-1954, 12 pgs.

(56) References Cited

OTHER PUBLICATIONS

Search Report dated Jun. 28, 2018 in European Patent Application No. EP17306982.4.
Jaiswal Prakhar et al.; "Assembly-based conceptual 3D modeling with unlabeled components using probabilistic factor graph"; Computer Aided Design, Elsevier Publishers, vol. 74, Nov. 10, 2015.; pp. 45-54.
K. Merriliance; "Chapter 4 Object Picking Using Mouse Picking Technique"; An Analytical Study of Various Object Picking Algorithms in Non Immersive Virtual World; Feb. 10, 2017; pp. 134-150.
Abhijit S. Deshmukh; "Content-based search of mechanical assemblies"; Jan. 1, 2006, 147 pgs.
Hij Kai-Mo et al.; "Relaxed lightweight assembly retrieval using vector space model"; Computer Aided Design Elsevier Publishers; vol. 45, No. 3; Oct. 7, 2012, pp. 739-750.
Chu C-H et al.; "Similarity assessment of 3D mechanical components for design reuse"; Robotics and Computer Integrated Manufacturing, Elsevier Science Publishers; vol. 22, No. 4; Aug. 1, 2005; pp. 332-341.
Pradeep Khosla, et al.; "Determining the assembly sequence from a 3D model"; Journal of Mechanical Working Technology; vol. 20; Sep. 13, 1989 (Abstract Only).
Office Action dated Jan. 21, 2019, in Europe Patent Application No. 16 176 763.7-1222 (11 pgs.).
Office Action issued in Europe Patent Application No. 16 306 790.3-1224; 10 pgs.
Office Action dated Mar. 30, 2021 in China Patent Application No. 201610555721.8 (with English Translation); 14 pgs.
Johan W.H. Tangelder, et al.; "A Survey of Content Based 3D Shape Retrievals Methods"; Multimedia Tools and Application; vol. 39, No. 3; Published online: Dec. 8, 2007; 31 pgs.
Fei Cheng; "Research on GPU-based 3D Infrared Cloud Background Simulation Method"; Information Technology Series of the Full-Text Database of China's Excellent Master's Thesis; No. 11; Nov. 15, 2010; 68 pgs.
Japanese Office Action dated Jun. 23, 2020 in Patent Application No. 2016-104328 (with English translation), 6 pages.
Japanese Office Action dated Jul. 7, 2020 in Japanese Patent Application No. 2016-104365 (with English translation), 8 pages.
Office Action dated Jul. 20, 2021 in Japan Patent Application No. 2017-209113 (with English translation); 9 pgs.
Raluca Diana Petre, et al.; "An Experimental Evaluation of View-Based 2D/3D Indexing Methods"; Exterior 2; HAL.Archives-Ouvertes; IL; Oct. 4, 2014; https://hal.archives-ouvertes.fr/hal-00738212; 9 pgs.
Nakazawa et al.; "Shape-Similarity Search of 3D Models Using an Appearance-Based Sharp Feature"; Visual Computing/Graphics and CAD Joint Symposium 2003; Proceedings, Japan; Incorporated Information Processing Society; Jun. 19, 2003; 9pgs.
Office Action dated Mar. 22, 2019, in Korea Patent Application No. 10-2013-0168725 (w/English-language translation), 8 pgs.
Office Action dated Jun. 8, 2021 in Japan Patent Application No. 2017-118779 (with English-language translation); 10 pgs.
Official Notice of Rejection dated Nov. 30, 2021 in corresponding Japanese Patent Application No. 2017-245010, (with English translation)(12 pages).

\* cited by examiner

REPLICA SELECTION

CROSS-REFERENCE TO RELATED APPLICATIONS

This application claims priority under 35 U.S.C. § 119 or 365 to European Application No. 16306790.3, filed Dec. 22, 2016. The entire contents of the above application(s) are incorporated herein by reference.

FIELD OF THE INVENTION

The invention relates to the field of computer programs and systems, and more specifically to a method, system and program for designing a three-dimensional modeled (3D) modeled object.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behaviour of a future product. CAM is an acronym for Computer-Aided Manufacturing, e.g. it relates to software solutions for defining manufacturing processes and operations. In such CAD systems, the graphical user interface plays an important role as regards the efficiency of these techniques. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Recent CAD systems now allow the user to design a 3D modeled object, based on a boundary representation (B-Rep) of the 3D modeled object. The B-Rep is a data format comprising a set of faces, each defined as a bounded portion of a respective supporting surface. The faces are defined with vertices and edges connecting the vertices. The user can act on the set of faces, by modifying existing faces, creating new faces, deleting some faces, and/or defining constraints on faces and/or between faces, or any actions of the like provided by the CAD system at use. In such a case, for efficiency purposes, the history of the solid is generally not available to the user. Thus, B-Rep CAD systems are history-free CAD systems, that is, they seek to overcome procedural rules of solid-based CAD systems that are typically history based.

Compared to solid-based modeling in which the model is implicit (the model is calculated from a set of operations on primitives), B-Rep modeling contains an explicit model of faces. However, the features of a B-Rep model are implicit; that is, the features of a B-Rep model are recognized from an interpretation of the geometry and topology of the model.

Thus, one of the aspects of such B-Rep CAD systems is the identification of "pattern", also referred to as "pattern recognition". The term "pattern" refers to regular layouts of copies of the same geometric feature. A geometric feature is a set of connected faces of the B-Rep that represent a functional feature of the object modeled by the B-Rep. Recognizing patterns allows the handling of such patterns as a single element during the design, thereby widening the array of design possibilities. Pattern recognition is relevant in different domains of CAD, such as mechanical design, consumer goods, building architecture, aerospace, or other domains.

Pattern recognition may be related to feature recognition. Feature recognition is useful for recognizing characteristic shapes on a given 3D object, e.g. the 3D object models a part of a mechanical product. Characteristic shapes of interest for mechanical design include for example holes, extruded pads, extruded pockets, fillets or rounds, revolute pads, and/or revolute pockets. Recognizing a characteristic shape amounts to identify its specifications through a better semantic level, for example the profile of an extruded or revolute shape, the revolution axis of a revolute shape, the radius value of rounds and fillets, an extrusion direction, and/or an extrusion depth. This information is used either to modify the shape, for example by editing the profile of the extrusion, or to feed a downstream process, machining process for example.

As explained hereinabove, history-free CAD systems aim at making easier the changes of the shapes of solids by using only its B-Rep. To make the editing simple from the user point of view, the "direct editing" technology should recognize the local shapes of the solid. For example, the system should maintain the cylindrical shape of a hole (and not change the cylinder into a free form surface), maintain the vertical direction of the pocket's walls, and/or maintain the revolute or extruded nature of a shape. Consequently, feature recognition is unavoidable, even in the "direct editing" field.

Feature recognition capabilities are available in commercial CAD systems through the following procedure. At first, the user selects the type of feature to recognize. Then, optionally, the user selects one or more faces of the feature on the solid for initializing the searching. Finally, the system performs the recognition on the solid of the selected type of feature and yields the specifications of the recognized feature.

When designing a physical part on a CAD system, a typical user's activity comprises the selection of a geometrical object displayed on the screen for performing an action thereon. The action can be for instance edition, rigid motion, deletion, copy, cut, coloring, etc. In many situations, a given action must be applied to a plurality of geometrical objects. To save time, the action is preferably applied in one shot to the plurality of geometrical objects. To that aim, all objects must be selected before the collective action is triggered. Typical example is "select all rounds with radius smaller than 5 mm and remove them from the solid". Selecting multiple objects is done through a dedicated dialogue, adding interactions to the initial design intent.

A standard way to select several objects is to press the "Shift" key, select objects one by one with a pointer and release the "Shift" key when all the objects have been selected. Similar operation is possible with another key, e.g. with "Ctrl" key. Another way for multiple selection is to open a dedicated dialog box, to define selection criteria (type, property, value . . . ), to run the search and to collect the resulting set. A rectangular box can be used as well for selecting graphic objects inside or crossing the box.

These standard ways to select several objects have however drawbacks. A first problem is that they add many interactions to the current man machine dialogue. This makes the design more difficult because the user must temporarily leave the current action in order to perform the multi-selection, and then go back and continue the initial action. If the multi-selection ends with an error, the whole work is restarted from scratch, leading to a weak productivity. A second problem is that some geometries may be forgotten (that is, they are not selected) because they are hidden to the view of the user that performs the selection. This always happens with complex mechanical parts and may lead to design errors.

Thus, the existing solutions lack efficiency, notably from a user utilization point of view and from an exhaustiveness point of view. Within this context, there is still a need for an improved solution for designing a 3D modeled object.

SUMMARY OF THE INVENTION

It is therefore provided a computer-implemented method for designing a three-dimensional modeled physical part. The method comprises:
providing a boundary representation of the modeled physical part;
selecting, upon user action, a subset of the boundary representation that represents a geometric feature;
identifying all the subsets of the boundary representation that are similar to the selected subset of the boundary representation by applying a feature similarity function.
The method may comprise one or more of the following:
performing a modification on the selected subset of the boundary representation; and applying a similar modification to each identified subset of the boundary representation;
grouping faces of the boundary representation into groups of faces, each face of a group being similar with the other faces of the group; and wherein the identification of all the subsets comprises: selecting a first face of the selected subset of the boundary representation; selecting a face in the group of faces the selected first face belongs to; identifying a similarity transformation T between the face of the selected subset of the boundary representation and the face in the group of faces the selected first face belongs to; selecting a second face of the selected subset of the boundary representation that is different from the first one selected; searching, in the group of faces the second face belongs to, for a face that is equal to the similarity transformation T that is applied to the second face;
the steps of selecting a second face and searching for a face are iterated, the one or more of the faces identified as a result of the search being in an iteration being discarded for the next iteration;
highlighting all the identified subsets of the boundary representation;
the geometric feature is a set of connected faces that represent a functional characteristic in the three-dimensional modeled physical part.

It is further provided a computer program comprising instructions for performing the method.

It is further provided a computer readable storage medium having recorded thereon the computer program.

It is further provided a computer-aided design (CAD) system comprising a processor coupled to a memory and a graphical user interface, the memory having recorded thereon the computer program.

The CAD system may be a history-free CAD system.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
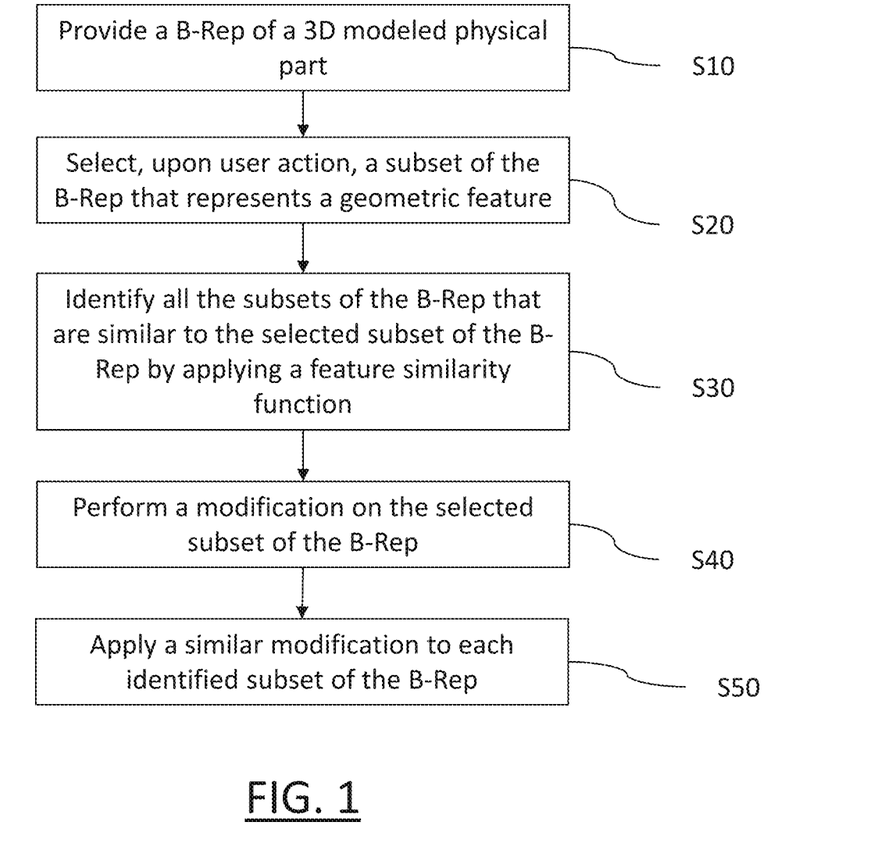
FIGS. 1 and 2 show a flowchart of an example of the method.

In reference to the flowchart of FIG. 1, it is proposed a computer-implemented method for designing a three-dimensional (3D) modeled physical part. The method comprises providing a boundary representation of the modeled physical part. The boundary representation is also referred to as B-Rep. The B-Rep comprises a set of faces. Each face may be identified as a bounded portion of a respective supporting surface. The method also comprises selecting, upon user action, a subset of the boundary representation that represents a geometric feature. A geometric feature is a set of connected faces of the B-Rep that represent a functional feature of the object modeled by the B-Rep. Thus, a geometric feature comprises two or more faces of the B-Rep. The expression "functional feature" means a shape of interest for the modeled physical part, e.g. a mechanical part. A functional feature includes for example holes, extruded pads, extruded pockets, fillets or rounds, revolute pads, and/or revolute pockets. Functional features are notably used in feature-based CAD. The method further comprises identifying all the subsets of the boundary representation that are similar to the selected subset of the boundary representation by applying a feature similarity function.

Such a method constitutes an improved solution for designing a 3D modeled object, e.g. the object is a physical part such as a mechanical part. Especially, one single user selection of a subset of the B-Rep is needed for performing a global identification of all the geometric features of the model that are similar to the selected subset of the B-Rep: the user does not need any more to manually select similar geometric features on the object. The multiple selection is performed through a unique user interaction. Clearly, this is shorter than traditional multiple selection dialogues. Therefore, a better result is obtained with less interactions. Thus, the user stays concentrated on the initial action and there is no loss of productivity. In addition, hidden similar geometries are captured anyway, thus reducing the risk of design error. Furthermore, the identification of the features is based on a similarity function that allows recognizing features that are similar or alike.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts. The CAD system may a history-free CAD system that allows easily change the shape of a solid by using only its B-Rep.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semi-conductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round) and/or standard surfacing features (e.g. sweep, blend, loft, fill, deform, and/or smoothing). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (e.g. a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

A CAD system may a history-free CAD system that allows easily change the shape of a solid by using only its B-Rep. The history-free based modeling paradigm is known since the mid of the 2000's. History-free based modelling is therefore a new and recent category of CAD systems. CAD software developers have focussed on robustness of the history-free based CAD systems, and they have not put stress on user's needs and on improvement of ergonomic. A modeled object is described by a data representation: the B-rep (i.e. boundary representation). The B-rep is the result of the user actions on the B-Rep.

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique involves the modeling and analysis of complex systems composed of a plurality components from different fields of physics without CAD geometry data. CAE solutions allow the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 12:
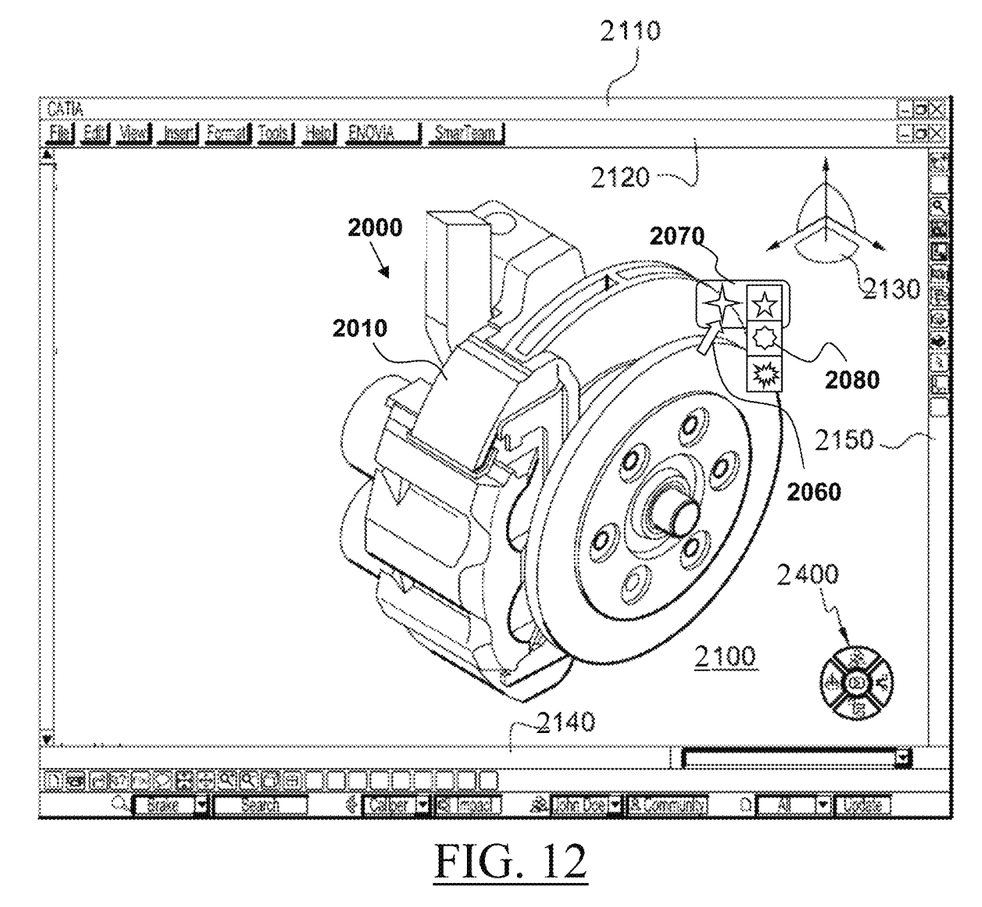
FIG. 12 shows an example of a graphical user interface of the system.

FIG. 12 shows an example of the GUI of the system, wherein the system is a history-free CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the B-Rep of the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.). The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 13:
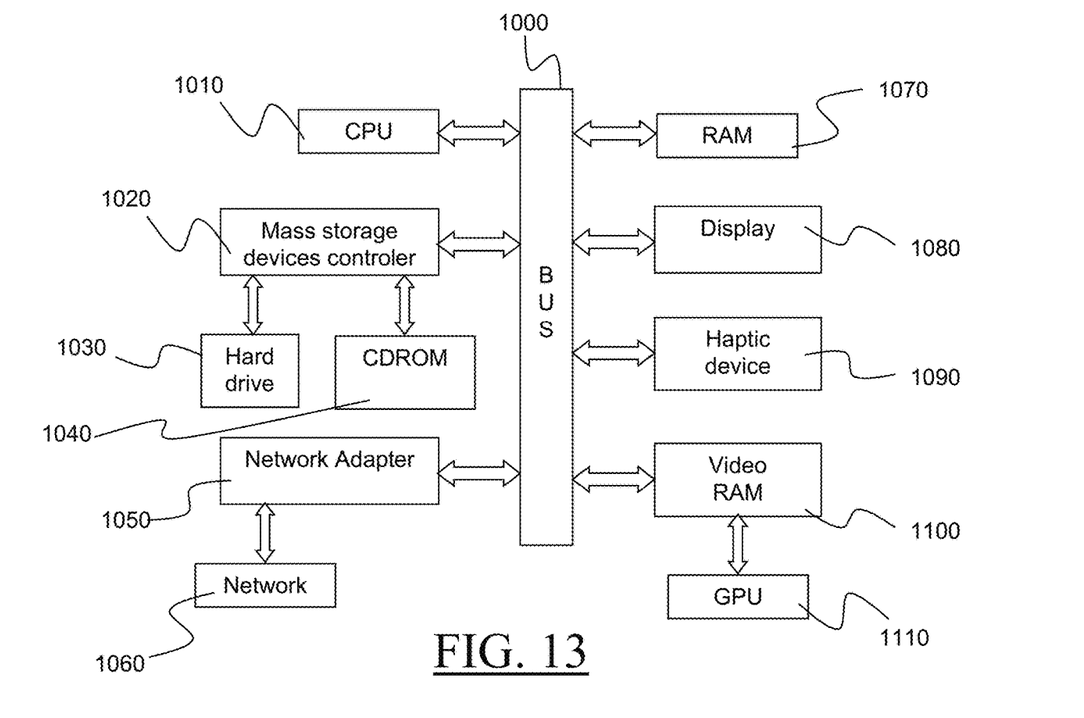
FIG. 13 shows an example of the system.

FIG. 13 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object.

The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

Referring back to FIG. 1, a boundary representation of a modeled physical part is provided (S10). The modeled object represented by the B-Rep is a part, e.g. a mechanical part. The providing S10 may result from a designer working on a modeled object (in this case on its boundary representation), or from the fact that the method may be applied to already existing B-Reps, e.g. retrieved in existing libraries. The modeled object is in any case provided at S10 as a B-Rep. The boundary representation is a widely known format for modeling a 3D object in terms of its envelop (i.e. its outer surfaces). The B-Rep thus designates data of a specific format that may comprise geometrical data and topological data. Geometrical data are data that provide geometrical entities, which are entities described in terms of 3D positions. Topological data are data that provide topological entities, which are entities described in terms of references to geometrical entities and/or relationships with other topological entities, e.g. relative positioning. Typically, the relationships may include an "is bounded by" relationship that associates a topological entity to other topological entities by which they are topologically bounded.

The providing S10 may preferably exclude any history data: the modeled object provided at S10 is in this case history-free. This means that the modeled object is not associated to any data indicating the history of its design, but only by declarative data, including the B-Rep. Thus, the method works within a context where the designer is not in possession of the history of the modeled object, which notably implies that geometrical patterns designed on the modeled object are not defined as such on the modeled object provided at S10. Here, the expression "geometrical pattern" is related to "geometric feature" that is a set of connected faces of the B-Rep that represent a functional feature of the object modeled by the B-Rep, as previously defined.

In the case of the method, the (e.g. geometrical) data include at least so-called "supporting surfaces", for example parametric surfaces (i.e. 3D surfaces modeled in terms of 3D positions associated to parameters defining a 2D domain). The supporting surfaces may typically be NURBS surfaces, but also planar, canonical or procedural surfaces. And the (e.g. topological) data include at least a set of faces, each face being defined as a bounded portion of a respective supporting surface (provided in the geometrical data). Thus, a face corresponds to a trimmed surface. The supporting surfaces are thus surfaces on which the faces are defined (thereby "supporting" the faces), in any way, by a trimming operation.

The notion of B-Rep, although widely known, is now further discussed through an example of a modeled object that may be provided at S10. Other examples of B-Reps, for example with relationships different from the "is bounded by" relationship, for at least some topological entities, may however be contemplated by the method.

As already mentioned, a B-Rep of a modeled object may include topological entities and geometrical entities. The geometrical entities may comprise 3D objects that are surfaces (e.g. planes), curves (e.g. lines) and/or points. Surfaces may be provided as functions of two parameters. Curves may simply be provided as functions of one parameter. And points may be provided as 3D positions. The topological entities may comprise faces, edges, and/or vertices. By its definition, a face corresponds to a bounded portion of a respective surface, named the supporting surface. The term "face" may thus indifferently designate such bounded portion of the surface or the corresponding bounded portion of the 2D domain. Similarly, an edge corresponds to a bounded portion of a curve, named e.g. the supporting curve. The term "edge" may thus designate such bounded portion of the curve or of its domain. A vertex may be defined as a link to a point in 3D space. These entities are related to each other as follows. The bounded portion of a curve is defined by two points (the vertices) lying on the curve. The bounded portion of a surface is defined by its boundary, this boundary being a set of edges lying on the surface. Edges of the face's boundary are connected together by sharing vertices. Faces are connected together by sharing edges. By definition, two faces are adjacent if they share an edge. Similarly, two edges are adjacent if they share a vertex. Surfaces, curves, and points may be linked together via their parameterization. For example, a value of the parameter of the parametric function defining a curve may be provided to define a bounding vertex. Similarly, a function linking the parameter of a curve to the two parameters of a surface may be provided to define a bounding edge. However, the very detailed structure of such topological data of a B-Rep is out of the scope of the present explanations. Further considerations regarding the notion of B-Rep are available in document EP12306720.9. The B-Rep model definitions disclosed in the EP12306720.9 apply to the present invention.

Next, at step S20, the user (e.g. a designer) select a subset of the B-Rep that represents a geometrical feature. Said otherwise, the user performs an action through the graphical user interface in order to trigger the selection of two or more connected faces of the B-Rep. A geometrical feature is a set of connected faces that represent a functional characteristic in the 3D modeled physical part that is represented by the B-Rep. For instance, a functional characteristic may be, but is not limited to, a hole, a fillet, a chamfer, a boss, a cut, . . . . The functional characteristic refers to a region of the B-Rep of a part with some interesting geometric or topological properties, especially in view a manufacturing operation of the 3D modeled object.

The feature recognition is performed as known in the art. For instance, the user selects on the on B-Rep a face of the feature to recognize, then he selects the type of shape to recognize (Boss, Cut . . . ), and the system the system recognizes (one could say identify) the feature. As another example, the user selects the type of feature to recognize. Then, optionally, the user selects one or more faces of the feature on the solid in order to initialize the searching. The system performs the recognition and yields the specifications of the recognized feature.

Next, at step S30, an identification of all the subsets of the boundary representation that are similar to the selected subset of the provided boundary representation is performed by applying a feature similarity function. Said otherwise, a finding of shapes that are similar to the one selected at step S20 is performed. The identification of one or more subsets of the B-Rep similar to the one selected at step S20 is carried out as known in the art. For instance, the feature recognition may rely on the finding of all copies of geometrical features within the B-Rep of a physical part provided at step S10, and this finding of all the copies can be performed as disclosed in the above referenced document EP12306720.9; the system then search among all the copies those that are similar to the selected geometrical feature of step S20. The identified subsets of the B-Rep are similar, that is, they are geometrically identical or geometric replicas to the selected one (S20) modulo a similarity transformation. The similarity transformation is geometrical transformation of given types that is known per se. The similarity transformation is implemented by a feature similarity function.

A subset of the B-Rep is similar or alike the selected one (S20) when the set of axis systems of the value of a predetermined shape descriptor for a similar subset matches a set of axis systems of the value of a predetermined shape descriptor for the selected subset (S20) first object, and this modulo a same similarity transformation. In other words, the similarity transformation is a geometrical transformation of given types that transforms as many (virtually or approximately "all") axis systems as possible from the shape descriptor of the similar subset into axis systems that match (geometrically), e.g. exactly or with a predetermined tolerance, those of the shape descriptor of the subset selected at step S20. The shape descriptor is some multidimensional and numerical information that is computed from the solid model and that is intensively used for comparison purpose, as known in the art. An example of similarity transformation and shape descriptors are for example discussed in the document EP15305808.6 and can apply to the present invention. In an example of the invention, the feature similarity function thus implements the similarity transformation of the document EP15305808.6. The feature similarity function applies on the B-Rep that is loaded (S10) on the system executing the present invention.

Figure 2:
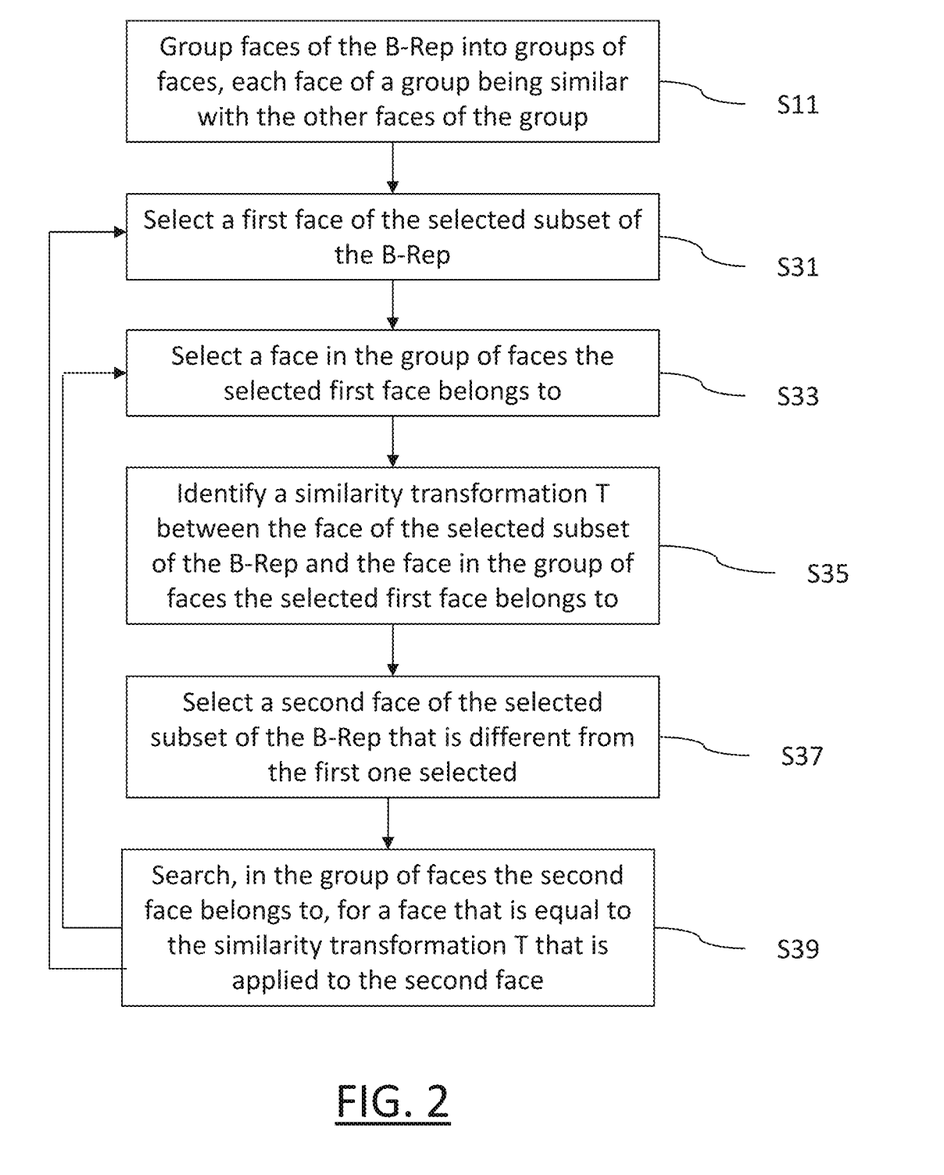

In reference to FIG. 2, it is now discussed an example of identification of the subsets of the boundary representation that are similar to the selected one (S20).

First, at step S11, the faces of the boundary representation are grouped into groups of faces. As explained hereinbefore, the (e.g. topological) data of the model (provided in S10) include at least a set of faces, each face being defined as a bounded portion of a respective supporting surface (provided in the geometrical data). One or more groups of faces are thus created. A face that belongs to a given group is similar with the other faces that belong to this given group. Thus, a group of faces is a subset of similar faces of the provided B-Rep. The identification of similar face can be performed as known in the art. In an example of the invention, the identification of similar faces is performed as discussed in the document EP15305808.6.

Figure 3:
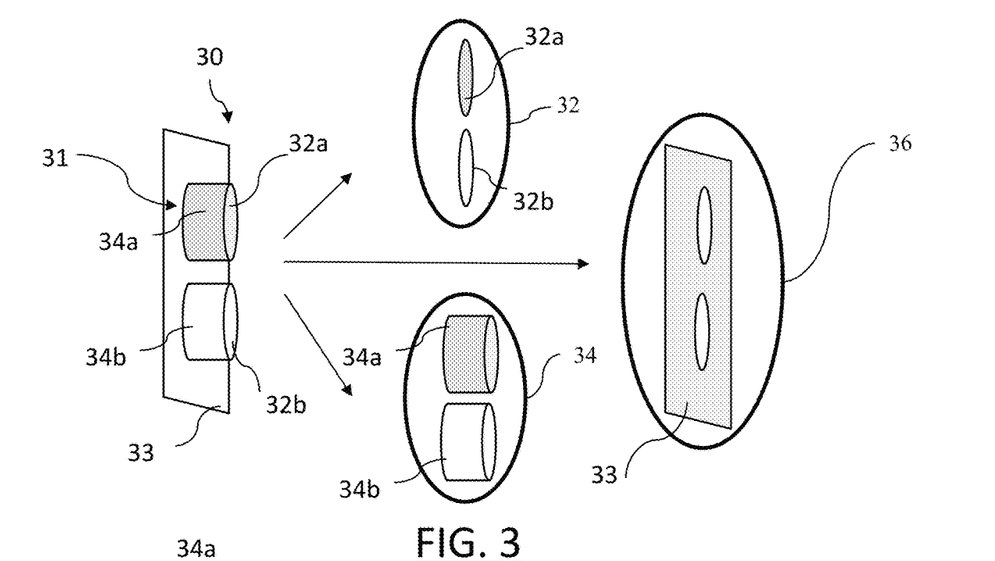
FIGS. 3, 4 and 5 illustrate the flowchart of FIG. 2.

FIG. 3 illustrates the step S11. The step S11 is typically performed after step S20. IT may also be performed after the step S10 have been performed. A part 30 represents a B-Rep of a 3D modeled physical part loaded on the system as a result of the step S10. The part 30 is comprised of two right circular cylinders of the same size, that is, both cylinders have same with radius r and height h. The two cylinder are secured on the surface plane 33. Three groups 32, 34, 36 of similar features are obtained. The first group 32 comprises similar bases of the two cylinders, namely the faces 32a, 32b of the part 30; in this example, these two faces are copies (that is, with identical geometries). The second group 34 comprises the cylindrical surfaces 34a, 34b of the two superimposed cylinders. The third group 36 comprises the plate 33. In this example, the extent to which the faces of a group 32, 34, 36 match can be determined, for instance, by use for each face, of a value of a shape descriptor computed from a set of axis of each face, and the values of the shape descriptors of the faces can then be simply evaluated, for a given similarity transformation.

Then, after the selection of by the user of a subset of the B-Rep (S20), a first face of the selected subset of the boundary representation is selected (S31). This selection is preferably performed by the system, e.g. the first face is randomly selected. Any face of the selected subset can be selected at first, and this choice has no impact on the efficiency of the example of FIG. 2.

Next, at step S33, a face is selected in the group of faces the selected first face belongs to. Again, any face in the group can be selected at first.

Then, at step S35, a similarity transformation (noted T) is identified between the first face of the selected subset of the boundary representation (S31) and the selected face in the group of faces the selected first face belongs to (S33). The similarity transformation can be a geometrical transformation of given types, that is known per se, that transforms as many (virtually or approximately "all") axis systems as possible from the shape descriptor of the selected first face (S31) into axis systems that match (geometrically), e.g. exactly or with a predetermined tolerance, those of the shape descriptor of the selected face (S33) in the group of faces the selected first face belongs to. In practice, the transformation can be any of the known isometric transformations.

Figure 4:
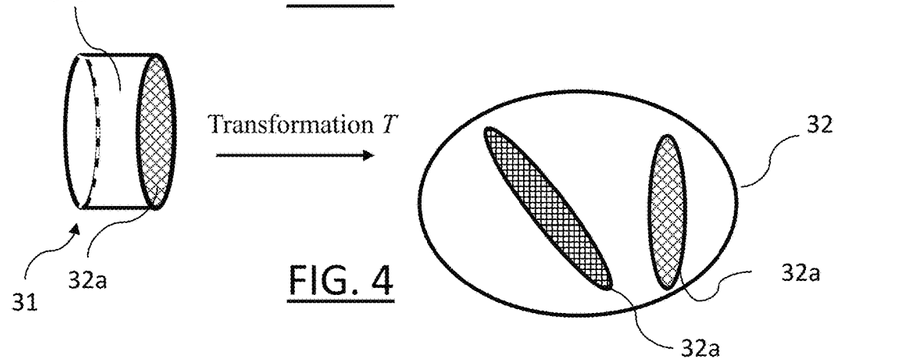

FIG. 4 illustrates the step S35. The cylinder 31 is the subset of the B-Rep 30 that has been selected by the user. A first face 32a is selected on the subset 31. This face belongs to the group 32. A second face 32b (also referred to as the second face selected) is selected in the group 32. A similarity transformation T between the faces 32a and 32b is identified. The transformation can be a geometrical transformation of a given type. In this example, the transformation is a translation.

Then, at step S37, a second face is selected on the selected subset of the boundary representation. This second face is different from the first one selected at step S31. A face previously selected (the first face 32a in the example of FIG. 4) is thus discarded.

Figure 5:
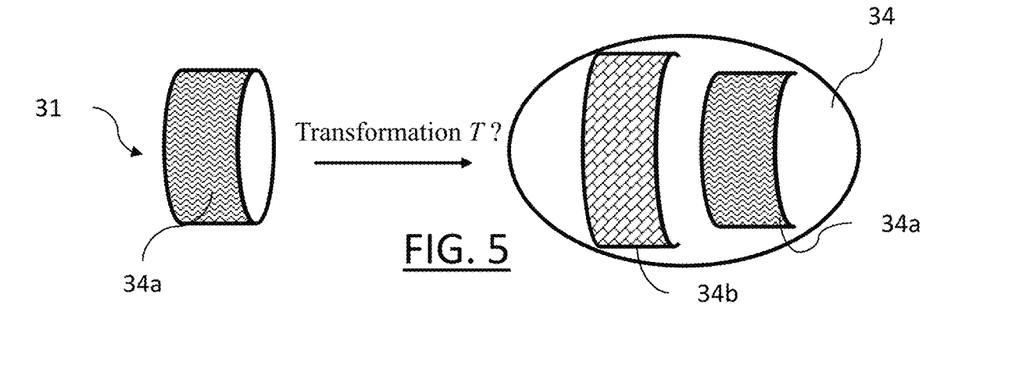

Following to the selection of the second face (S37), a search is carried out, in the group of faces the second face belongs to, for a face that is equal to the similarity transformation T that is applied to the second face (step S39). The step 39 is illustrated in FIG. 5. If a face 34b is equal to the similarity that is applied to the second face 34a, the second face 34a is identified as matching with the transformation T identified at step 35.

The steps S33 and 39 are repeated until all the faces of the selected subset of the boundary representations have been tested, that is, until all the faces of the group of the first face have been tested. One understands that a face identified as matching will be discarded for the next iteration as the transformation linking the two faces has already been identified.

Each face of the selected subset of the B-Rep is tested the same way as explained in relation with steps S31 to S39. The steps S31 to S39 are thus repeated for each face of the selected subset. Hence, once all the faces of the selected subsets have been tested, all the subsets of the B-Rep that are similar to the selected subset of the B-Rep are identified.

At this step of the method, all the subsets of the B-Rep that are copies or similar to the selected subset are identified. This means that the system knows all these subsets.

When all the subsets are identified, the system may inform the user of the result of the identification of step S30. This can be performed, for instance, by modifying the rendering of all the identified subsets. By this way, all the identified objects are highlighted. These objects are emphasized compared to the other objects (those that are non-identified). Other Then, at step S40, a modification is performed by the user on the subset selected at step S20. The modification may comprise the modification of a geometry of one or more faces of the selected subset. For instance, the user displaces one or more vertices and/or edges of a face of the subset. As another example, the user modifies one or more values that characterized the selected geometrical feature, e.g. the user modifies the diameter of one of the bases of cylinder 31. The allowed modifications are not limited to these examples; any modification as known in the can be made on the selected subset of the B-Rep.

At step S50, a similar modification is applied on each identified subset of the B-Rep. The similar modification is computer by applying on the feature similarity function on each modified face of the subset selected by the user. The similarity transformation T identified for the modified face of the subset (S40) is applied on the faces of all the subsets that were identified as matching with the transformation T (S35). For instance, and is reference to FIG. 5, the transformation T of the base 34a of the cylinder 31 is applied on the face 34b. As a result of the step S50, all the subsets similar to the selected subset are modified in a similar way.

Figure 11:
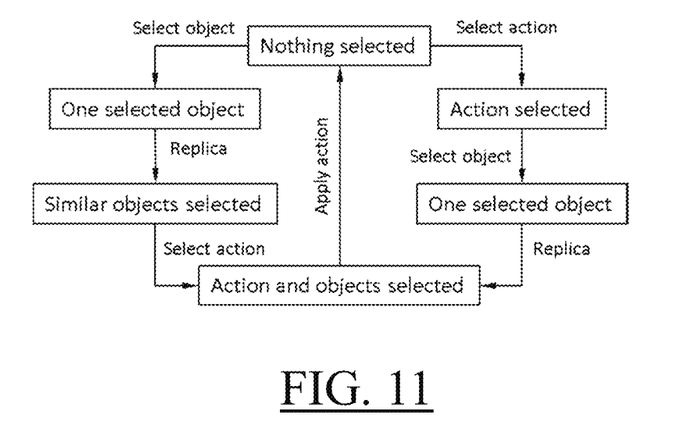
FIG. 11 illustrates examples of the invention by using a graph of a finite state machine.
Figure 14:
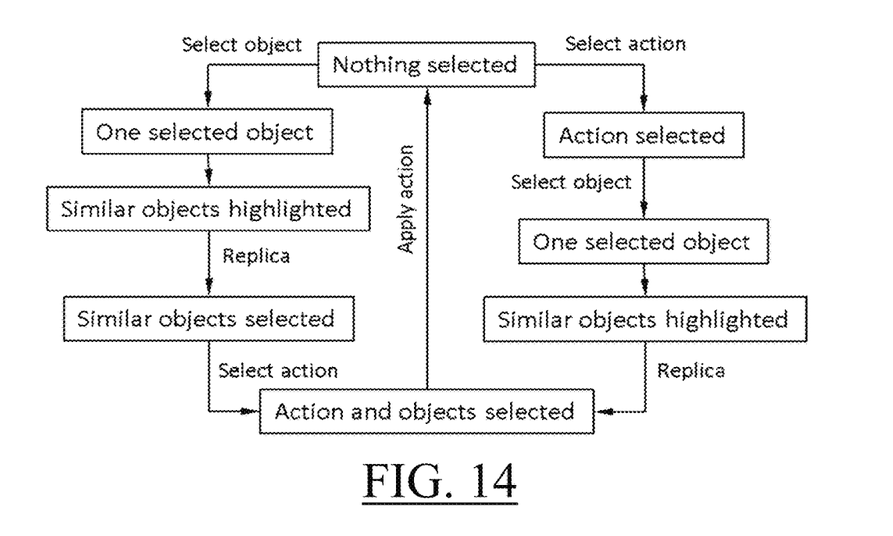
FIG. 14 illustrates examples of the invention by using a graph of a finite state machine.

FIGS. 11 and 14 illustrate examples of the invention of by using a graph of a finite state machine. A finite state machine is a formal entity of language theory science, which is advantageously represented by a directed graph. Each node is a state of the system and each arc is labeled by a user interaction. Each time the user performs an interaction, the system launches computations and its state changes.

The left side of the FIGS. 11 and 14 captures the object/action possibilities while the right side captures action/object possibilities.

In this example, the method of the invention is triggered by the user by performing action on a graphical tool that is displayed on the GUI, e.g. the GUI of FIG. 12. This graphical tool can be accessed through standard menu bars 2110, 2120, as well as bottom and side toolbars 2140, 2150. The graphical tool may thus be a user-actionable icon. Preferably, this graphical tool is embedded in the GUI 2100; this improves the interactions of the user (e.g. a designer) that are distributed between the graphical tool and the representation of the 3D modeled object. In the following, the graphical tool is now called "Replica" Button, or "Replica".

Figure 6:
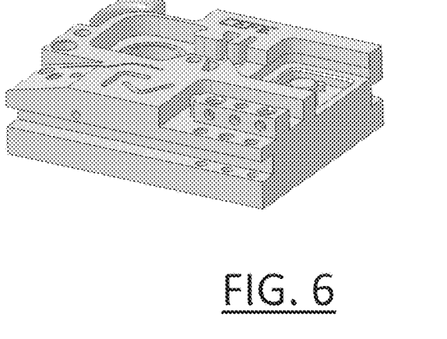
FIGS. 6 and 7 illustrate B-Reps of 3D modeled physical parts.
Figure 7:
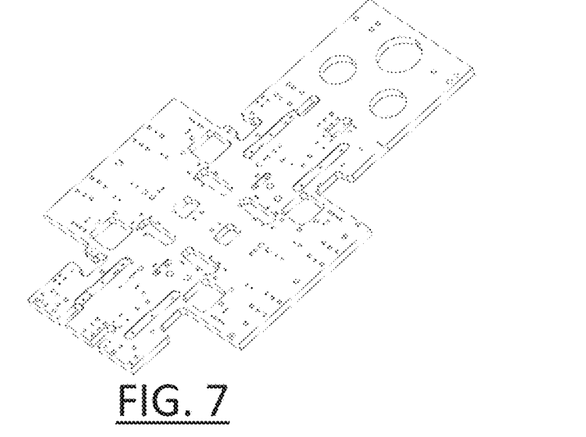
Figure 8:
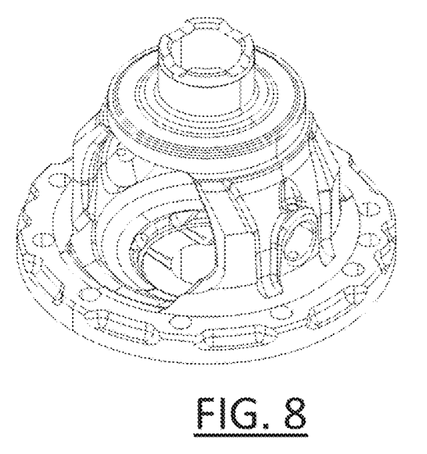
FIGS. 8, 9 and 10 illustrate the flowchart of FIG. 1.

A B-Rep of an object—for instance a part from consumer goods industry—, is displayed on the GUI, e.g. the GUI of FIG. 12. The invention is particularly efficient when dealing with complex mechanical parts including many similar features. FIGS. 6-10 illustrate example of such mechanical parts that can be typically manufactured by machining a rough block (as illustrated in FIG. 6) or by machining a molded part as illustrated in FIG. 7-10). The machining is a 3D axis process and/or a drilling process. The arrangement, if any, of similar features according to a special structure (grid, line, crown . . . ) is not significant. The mechanical part is complex in the following meaning. Its shape involves holes and pockets hiding smaller feature.

In the initial state, nothing is selected: neither a geometry nor an action is selected. When the user selects a subset of the B-Rep that represents a geometrical feature, the selected subset is identified to the system, that is, the selected subset is recorded by the system for further processing. This is represented on FIG. 11 as the "one selected object" state.

In order to collect all geometries similar to the selected one (S30), the user can perform a user action on the "Replica" button; the user can click on the button, e.g. with the cursor 2060 of FIG. 12. The system launches the search and collects the resulting objects in the multiple selection, for instance the system performs the steps discussed in reference to FIG. 2.

As a result, the state changes to "Similar objects selected": all objects of interest are collected, that is, they are identified by the system. The user selects (S40) an action to be applied on the selected subset of the B-Rep; for instance, the user edit the subset, applies a rigid motion on the subset, deletion one or more or all faces of the selected subset, copy, cut, coloring, etc. Now, the state is "action and objects selected" and the system is ready to apply the similar action on all the identified subsets (S30). The action can be applied as a result of a user action on the "Replica" button.

The right side of the graph of FIG. 11 describes the action-object sequence, that is when the user first selects the action and then the objects on which the action is applied. The user selects (S40) an action to be applied. The state is "Action selected". Then the user selects a subset of the B-Rep, e.g. a geometrical feature of the B-Rep. This is represented as the "one selected object" state. Next, all subset of the B-Rep of interest are collected, that is, they are identified by the system (S30). The action can be applied on all the subset of the B-Rep as a result of a user action on the "Replica" button.

Another example of the method is illustrated on FIG. 14. The user can anticipate the multiple selection of the similar subsets by highlighting similar subsets just after the user selects a first subset of the B-Rep (a geometry for instance). In the initial state, nothing is selected yet, neither a subset of the B-Rep nor an action. When the user selects subset of the B-Rep, it is recorded by the system for further processing, this is the "One selected object" state. The system immediately searches and highlights similar subsets without putting them in the user's selection. At this point, the user can see all subsets that are similar to the first selection. In other words, similar subsets are pre-selected by the system. Then, the user pushes and releases the "replica" button, which confirms that the pre-selected (and highlighted) objects must be part of the multiple selection. The state switches to "Similar objects selected". Since all subsets of interest are collected, the user selects the action to be applied. Now, the state is "Action and objects selected" and the system is ready for computation. This is done when the user presses the "apply" button.

In the example of FIG. 14, the transition from the "One object selected" state to the "Similar objects highlighted" state is automatic, meaning that it is performed by the system without additional user interaction.

Figure 9:
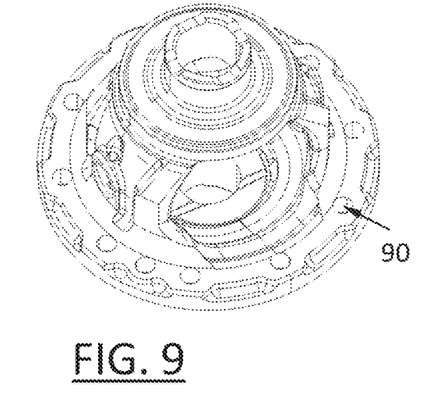
Figure 10:
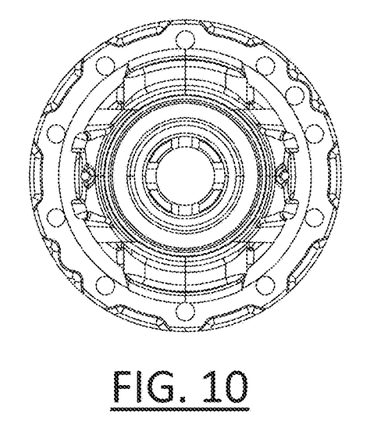

FIGS. 9 and 10 show an example of the invention wherein the B-Rep represents a powertrain part. In this example, the user wants to s to change the radius value of holes, e.g. the hole 90 on FIG. 9. The user selects a face of the hole 90 on the powertrain part represented by a B-Rep. This selection is done where the geometry is easily accessible. Then, the user presses the "replica" button and the system collects all holes featuring the same geometry, as illustrated in FIG. 10. In FIG. 10, each hole similar to the hole 90 is identified to the user with an arrow pointing toward the hole. Alternatively, the holes might be highlighted, e.g. by modifying their color. Now, if the user modifies the selected hole 90, the modifications will be applied on the similar hole upon user action on the "Replica" button.

Compared to the known solutions, the multiple selection of geometrical features similar to a particular one a is thus performed through a unique additional interaction. In other terms, multiple selections and modifications can be performed upon a user selection of a geometrical feature and a user action on a graphical tool adapted to execute the method according to the invention. Clearly, this is shorter that traditional multiple selection dialogues: less interaction for at least a same result. The user stays concentrated on the initial action, there is no loss of productivity. In addition, hidden similar geometries are captured anyway, thus reducing the risk of design error.

The invention claimed is:

1. A computer-implemented method for designing a three-dimensional modeled physical part, the three-dimensional modeled physical part being a CAD modeled object representing an industrial product, comprising:
   obtaining and displaying, by a computer, a boundary representation of the modeled physical part;
   selecting, upon first user action, a subset of the boundary representation that represents a geometric feature, the geometric feature including two or more connected faces of the boundary representation;
   identifying, by the computer, all the subsets of the boundary representation that are similar to the subset selected with the first user action of the boundary representation by applying a feature similarity function, the identified subsets being similar modulo a similarity transformation T;
   performing, based on second user action, a modification of a geometry of at least one face of the subset of the boundary representation previously selected with the first user action; and
   applying, by the computer and upon the second user action, a corresponding modification to each identified subset of the boundary representation that is similar to the subset selected with the first user action,
   further comprising:
   grouping faces of the boundary representation into groups of faces, each face of a group being similar with the other faces of the group, thereby obtaining a partition of the boundary representation of separate groups of similar faces,
   wherein the identification of all the subsets comprises:
      selecting a first face of the selected subset of the boundary representation;
      selecting a face, different from the first face, in the group of faces to which the selected first face belongs;
      identifying the similarity transformation T between the first face of the selected subset of the boundary representation and the face in the group of faces to which the selected first face belongs;
      selecting a second face of a second group of faces of the selected subset of the boundary representation that is different from the first one selected; and
      searching, in the second group of faces to which the second face belongs, for a face that is equal to the identified similarity transformation T that is applied to the second face.

2. The computer-implemented method of claim 1, wherein the steps of selecting a second face and searching for a face are iterated, the one or more of the faces identified as a result of the search being in an iteration being discarded for the next iteration.

3. The computer-implemented method of claim 1, further comprising:
   highlighting all the identified subsets of the boundary representation.

4. The computer-implemented method of claim 1, wherein the geometric feature is a set of connected faces that represent a functional characteristic in the three-dimensional modeled physical part.

5. A non-transitory computer readable data storage medium having recorded thereon a computer program that when executed by a computer causes the computer to implement a method for designing a three-dimensional modeled physical part, the three-dimensional modeled physical part being a CAD modeled object representing an industrial product, the method comprising:
   obtaining and displaying a boundary representation of the modeled physical part;
   selecting, upon first user action, a subset of the boundary representation that represents a geometric feature, the geometric feature including two or more connected faces of the boundary representation;
   identifying all the subsets of the boundary representation that are similar to the subset selected with the first user action of the boundary representation by applying a feature similarity function;
   performing, based on second user action, a modification of a geometry of at least one face of the subset of the boundary representation previously selected with the first user action; and
   applying, in response to the second user action, a corresponding modification to each identified subset of the boundary representation that is similar to the subset selected with the first user action,
   further comprising:
   grouping faces of the boundary representation into groups of faces, each face of a group being similar with the other faces of the group, thereby obtaining a partition of the boundary representation of separate groups of similar faces,
   wherein the identification of all the subsets comprises:
      selecting a first face of the selected subset of the boundary representation;
      selecting a face, different from the first face, in the group of faces to which the selected first face belongs;
      identifying the similarity transformation T between the first face of the selected subset of the boundary representation and the face in the group of faces to which the selected first face belongs;
      selecting a second face of a second group of faces of the selected subset of the boundary representation that is different from the first one selected; and searching, in the second group of faces to which the second face belongs, for a face that is equal to the identified similarity transformation T that is applied to the second face.

6. A computer-aided design (CAD) system comprising:

a processor coupled to a memory, the memory having recorded thereon a computer program for designing a three-dimensional modeled physical part, the three-dimensional modeled physical part being a CAD modeled object representing an industrial product, including instructions that when executed by the processor causes the processor to be configured to obtain and display a boundary representation of the modeled physical part, select, upon first user action, a subset of the boundary representation that represents a geometric feature, the geometric feature including two or more connected faces of the boundary representation, identify all the subsets of the boundary representation that are similar to the subset selected with the first user action of the boundary representation by applying a feature similarity function, perform, based on second user action, a modification of a geometry of at least one face of the subset of the boundary representation previously selected with the first user action; and apply, upon the second user action, a corresponding modification to each identified subset of the boundary representation that is similar to the subset selected with the first user action, wherein the processor is further configured to:

group faces of the boundary representation into groups of faces, each face of a group being similar with the other faces of the group, thereby obtaining a partition of the boundary representation of separate groups of similar faces, and identify all the subsets by being further configured to:

select a first face of the selected subset of the boundary representation;

select a face, different from the first face, in the group of faces to which the selected first face belongs;

identify the similarity transformation T between the first face of the selected subset of the boundary representation and the face in the group of faces to which the selected first face belongs;

select a second face of a second group of faces of the selected subset of the boundary representation that is different from the first one selected; and search, in the second group of faces to which the second face belongs, for a face that is equal to the identified similarity transformation T that is applied to the second face.

7. The CAD system of claim 6, wherein the CAD system is a history-free CAD system.

* * * * *